June 9, 1925. 1,541,090
R. M. YUNKES
VEHICLE LIFTER
Filed March 15, 1924 2 Sheets-Sheet 2
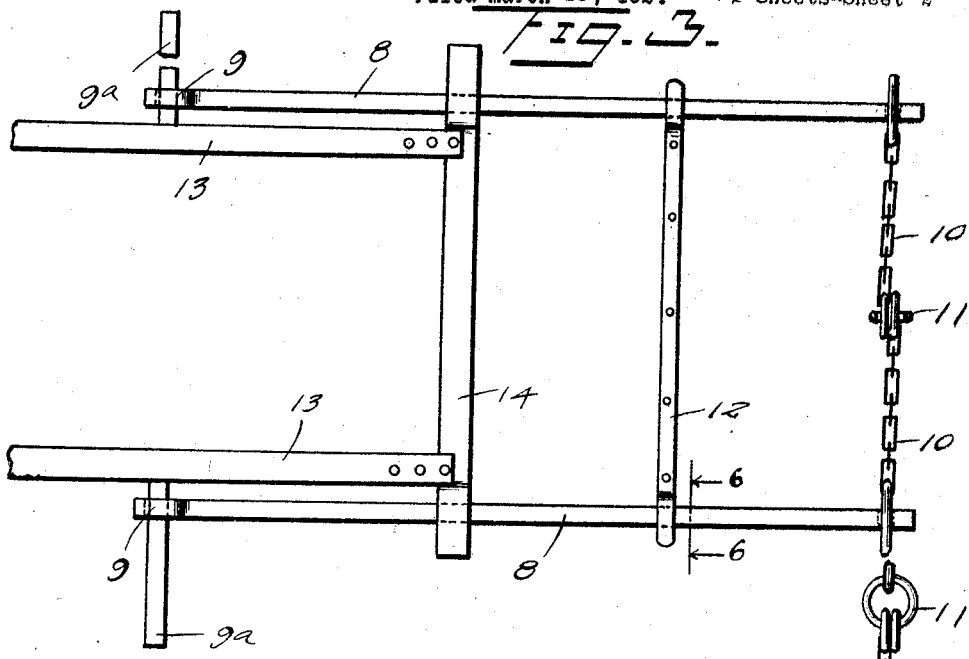
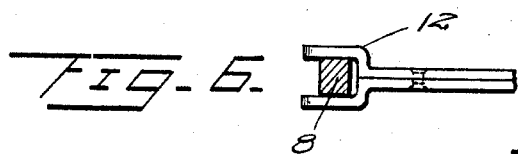
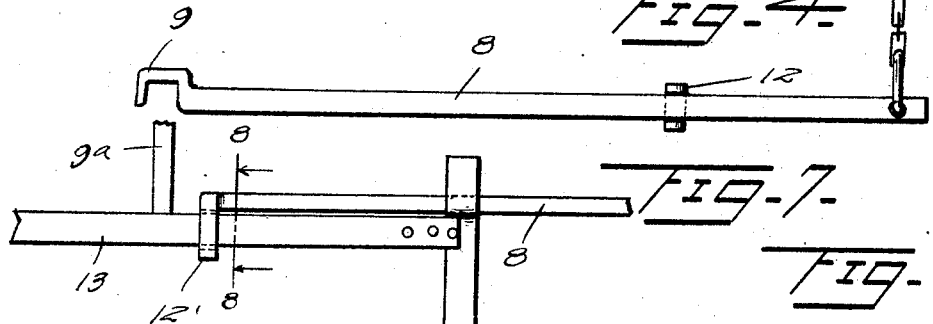
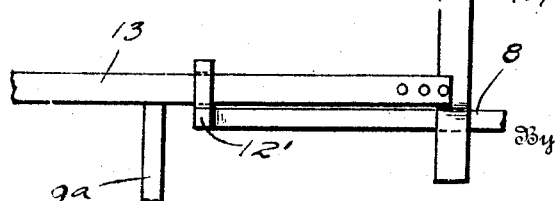
Inventor
R. M. Yunkes.
By
Attorney Patented June 9, 1925.

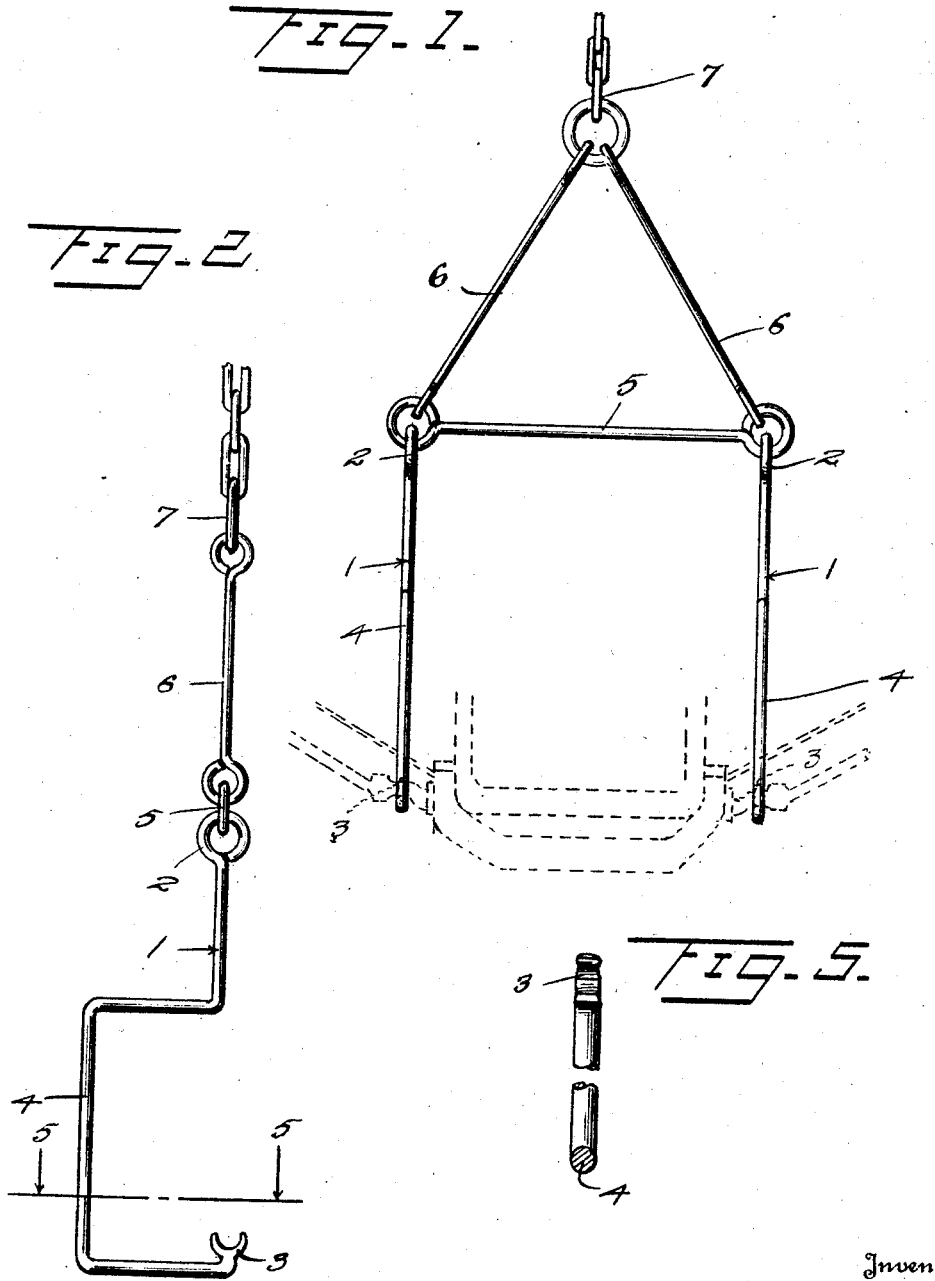

1,541,090

UNITED STATES PATENT OFFICE.

RUDOLPH M. YUNKES, OF ST. FRANCISVILLE, LOUISIANA.

VEHICLE LIFTER.

Application filed March 15, 1924. Serial No. 699,511.

*To all whom it may concern:*

Be it known that I, RUDOLPH M. YUNKES, a citizen of the United States, residing at St. Francisville, in the parish of West Feliciana and State of Louisiana, have invented certain new and useful Improvements in Vehicle Lifters; and I do hereby declare the following to be a full, clear, and exact description of the invention, such as will enable others skilled in the art to which it appertains to make and use the same.

The present invention relates to elevating means and more particularly to lifting means for raising vehicles, such as automobiles, to facilitate repairs, particularly when the same are located beneath the vehicle or in such position as to require the mechanic to get beneath the vehicle so as to reach the parts requiring attention.

Other objects and advantages will be apparent and suggest themselves as the nature of the invention is understood.

While the drawings illustrate an embodiment of the invention it will be understood that in adapting the same to meet different conditions and requirements, various changes in the form, proportion and minor details of construction may be resorted to without departing from the spirit of the invention.

Referring to the accompanying drawings forming a part of the application:

Figure 1 is a front elevational view showing the invention applied to the front part of an automobile, Figure 2 is a side elevational view of the front lifter, Figure 3 is a plan view of the rear lifter showing it applied, Figure 4 is a side view of the rear lifter, Figure 5 is a detail section on the line 5—5 of Figure 2, Figure 6 is a detail section on the line 6—6 of Figure 3, Figure 7 is a detail view of a modification, and Figure 8 is a section on the line 8—8 of Figure 7.

Corresponding and like parts are referred to in the following description and designated in the several views of the drawings by life reference characters.

The lifter as specifically constructed to be applied to the front part of an automobile comprises similar bars 1 having an eye 2 at the upper end and a hook 3 at the lower end to engage the lamp bracket adjacent the connection of the fender brace therewith. The lower portion of the bar is offset forwardly so as to clear the headlight and the front edge of the apron connecting the fender with the side bar of the vehicle. The offset portion of the bar is indicated by the numeral 4 and is of such dimensions as to provide ample clearance for the headlight and prevent injury thereto. A spacer 5 holds the upper ends of the bars 1 the proper distance apart and connections 6 attached to the ends of the spacer 5 converge towards their upper ends which are connected to an elevating chain or cable 7.

The rear lifter comprises similar bars 8 which are provided at their forward ends with offset hooks 9 which are adapted to engage a convenient portion of the vehicle, such as the running board bracket $9^a$. Chains 10 or like connecting means are attached to the rear ends of the bars 8 and a hoisting chain or cable 11 is adapted to be attached to the upper converged ends of the connections 10. A spacer 12 holds the bars 8 apart the required distance.

In the modification shown in Figures 7 and 8, the hooks 12′ at the forward ends of the bars 8 are offset laterally to engage the side bars 13 of the machine, otherwise the parts are substantially the same as shown in Figures 2 and 3. The rear lifter engages under the ends of the cross member 14 when in operative position.

What I claim is:

1. A vehicle lifter comprising similar bars having engaging hooks at their lower ends and having the lower portion of each offset so as to clear the headlights of a vehicle.

2. In a vehicle lifter, a triangular lifting frame comprising a horizontal spreader bar forming the base of the triangular frame, and inclined side bars having their meeting ends connected with a hoisting mechanism, and vertical lifting bars engaging the ends of the horizontal spreader bar.

In testimony whereof I affix my signature in presence of two witnesses.

RUDOLPH M. YUNKES.

Witnesses:
E. S. MUSE,
JULIUS J. YUNKES.